June 27, 1944.　　J. SAUL ET AL　　2,352,290
FLANGE SPREADER
Filed Nov. 30, 1939
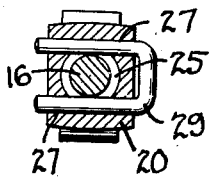
Fig.1
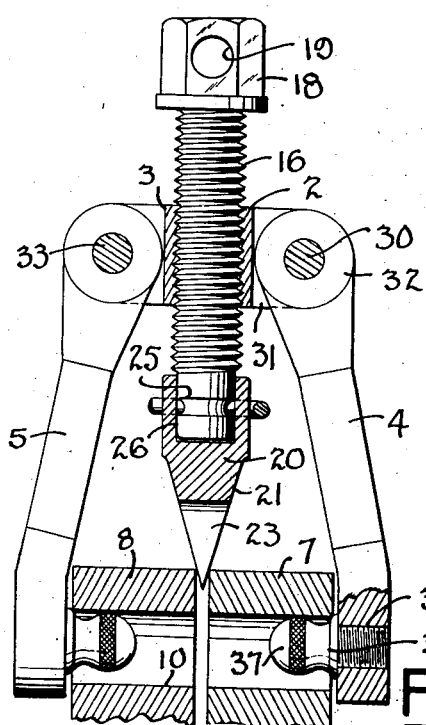
Fig.2
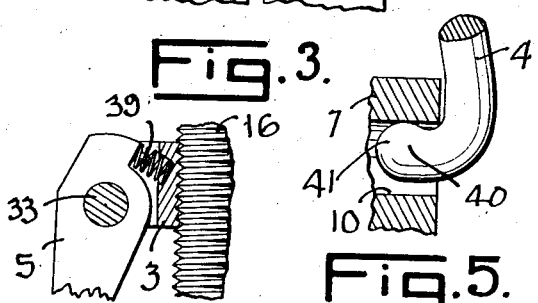
Fig.3.
Fig.4
Fig.5.
INVENTORS
Jos. SAUL
C.E. OLSEN
J.A. PETERSON
Jesse P. Stone
Lester B Clark
ATTORNEYS Patented June 27, 1944

2,352,290

UNITED STATES PATENT OFFICE 2,352,290

FLANGE SPREADER

Joseph Saul, Pasadena, and Carl E. Olsen and Joseph Arvid Peterson, Houston, Tex.; said Saul assignor to Gearench Manufacturing Company, Houston, Tex., a corporation of Texas Application November 30, 1939, Serial No. 306,808

2 Claims. (Cl. 254—100)

The invention relates to a flange spreader of a type to be used in connection with the spreading of flanges on pipelines, valve connections and similar structures.

In pipelines and various other structures where the parts are bolted together by flanged connections it is usually the practice to provide a gasket or packing between the flanges to maintain a seal. When these packings or gaskets become worn or destroyed due to pressure it is necessary to spread apart the flanges so as to insert a new packing or gasket. Often times it is difficult to obtain a sufficient amount of movement between the flanges in order to move them apart to permit the introduction of a gasket and to accomplish this the present tool has been devised with a view of providing a flange spreader which can be quickly attached and which will enable the operator to exert a sufficient force by use of the tool to spread the flanges.

Another object of the invention is to provide a flange spreader which may be readily attached and detached from the flanges.

Another object of the invention is to provide a flange spreader which will readily accommodate flanges of different thicknesses so that it may be used on various sized pipes.

Another object of the invention is to provide a rotatable head on the wedge spindle so that the head may be readily detached or replaced.

Still another object of the invention is to provide a flange spreader with removable studs which will fit in the bolt holes of the flanges so as to retain the spreader in position.

Other and further objects of the invention will be readily apparent when the following description is considered in connection with the accompanying drawing wherein:

Fig. 1 is a transverse section through the spindle to illustrate the connection of the head to the spindle.

Fig. 2 shows a vertical sectional view of the device wherein the arms are pivoted to accommodate flanges of different thickness.

Fig. 3 is a view looking at the base of the frame of Fig. 2 and showing the spindle in section.

Fig. 4 shows a spring pressed arm.

Fig. 5 shows a form of the arm where the end is bent in lieu of providing the stud of Fig. 2.

In spreading flanges the general practice is to drive one or more wedges between the flanges by use of a hammer and in this manner to spread the flanges and thereafter attempt to replace or repair the gasket or packing. Such practice has been found to be dangerous however because of the fact that in working on the connection these wedges are liable to spring out of place and injure the worker. The present tool has therefore been devised which can be securely affixed to the flanges and the desired amount of spreading accomplished without danger.

The tool is seen in the side view in Fig. 2 and comprises a body, frame or yoke 2 which is made up of a base portion 3 and the arms 4 and 5 extending therefrom. These arms are arranged to straddle the flanges 7 and 8 which are to be spread apart. Flanges of this sort are usually bolted together and have the openings or bolt holes 10 therein.

In order to apply the desired force to wedge the flanges 7 and 8 apart a spindle 16 is shown as threaded at 17 thru the base 3 of the frame. This spindle has a non-circular portion 18 thereon to which a wrench or other tool may be applied in turning it or a bar may be passed thru the opening 19 therein.

A wedge head 20 is positioned on the spindle and has the tapered faces 21 on the opposite sides thereof which will engage the inner faces of the flanges 7 and 8. This head has a slot 23 therein so that it may straddle a bolt when it moves inwardly between the flanges. The head 20 is subjected to wear because it is this head which contacts the flanges and the head is therefore made removable as best seen in Fig. 1. The end of the spindle 16 has an annular groove 25 therein where it fits into the socket 26 of the head 20. This construction is also seen in Fig. 2. The head 20 has transverse openings 27 therethru so that a U-bolt or wire 29 may be passed thru these openings 27 and will thus engage in the groove 25 to hold the head rotatably in position. In this manner the head can be wedged in between the flanges as the spindle advances due to its rotation.

Fig. 2 shows a slightly different form of the frame or body at 2 wherein the arms 4 and 5 are attached to the center part of the base 3 of the body 2 by the pivots 30. This structure is seen also in Fig. 3 wherein the base 3 is slotted at 31 to allow the ends 32 of the arms to be inserted therebetween, and the pivot pins 33 pass thru both the base and the arm. In this manner the arms 4 and 5 can be pivoted toward and away from each other to accommodate flanges of different thickness and in attaching and removing the tool. The ends of the arms 4 and 5 have a threaded opening 35 therein, each of which is shown as receiving a stud 36 which has a knob portion 37 thereon. These studs can be inserted in the openings 10 in the flanges and in this manner the tool is retained in position.

Fig. 4 shows a modification of the pivot construction 30 wherein a spring 39 is inserted between the base and the arm so that the arm will be normally urged inwardly toward the wedge and spindle. Thus in this manner the spring must be compressed in order to remove the tool.

Fig. 5 shows the end of one of the arms such as 4 which has had an integral portion 40 thereof bent over to form a knob 41 which is a modification of the knob 37 on the stud 36.

Broadly the invention contemplates a flange spreader which can be readily attached and removed from the flanges and which will facilitate spreading of the flanges without danger.

What is claimed is:

1. A flange spreader including a yoke shaped body, a spindle threaded thru the base of the yoke, a pair of spaced arms on said yoke to straddle the flanges to be spread, means to attach said arms to the flanges, and means on said spindle to penetrate between the flanges to spread them apart as said spindle is advanced, said arms being pivotally mounted on the base of the yoke, and spring means to normally urge said arms into contact with the flanges.

2. A flange spreader including means to spread the flanges, a body to carry said means, arms on said body to straddle the flanges to be spread, and means to engage in the bolt holes in the flanges to retain said arms including studs removably carried by said arms.

JOSEPH SAUL.
CARL E. OLSEN.
JOSEPH ARVID PETERSON.